(12) United States Patent
Nürnberg

(10) Patent No.: US 7,721,348 B2
(45) Date of Patent: May 25, 2010

(54) PROTECTIVE ELEMENT

(75) Inventor: Hans-Peter Nürnberg, Langenzenn (DE)

(73) Assignee: adidas International Marketing B.V., Amsterdam (NL)

( * ) Notice: Subject to any disclaimer, the term of this patent is extended or adjusted under 35 U.S.C. 154(b) by 1114 days.

(21) Appl. No.: 11/369,906

(22) Filed: Mar. 7, 2006

(65) Prior Publication Data

US 2006/0205303 A1   Sep. 14, 2006

(30) Foreign Application Priority Data

Mar. 8, 2005  (DE) ........................ 10 2005 010 614
Jan. 25, 2006  (EP) ................................ 06001524

(51) Int. Cl.
 *F41H 1/02*   (2006.01)

(52) U.S. Cl. ......................................................... 2/2.5

(58) Field of Classification Search ...................... 2/2.5; 428/68, 911; 442/134, 135; 89/36.02, 36.05
See application file for complete search history.

(56) References Cited

U.S. PATENT DOCUMENTS

| | | | |
|---|---|---|---|
| 991,036 A | 5/1911 | Spiegelman |
| 1,586,698 A | 6/1926 | Posner |
| 2,302,694 A | 11/1942 | Jennings |
| 2,386,502 A | 10/1945 | Peik |
| 3,404,406 A | 10/1968 | Balliet |
| 3,707,730 A | 1/1973 | Slider |
| 3,732,575 A | 5/1973 | Pakulak |
| 4,051,553 A | 10/1977 | Howard |
| 4,187,620 A | 2/1980 | Selner |
| 4,272,849 A | 6/1981 | Thurston et al. |
| 4,280,342 A | 7/1981 | Eng et al. |
| 4,366,634 A | 1/1983 | Giese et al. |
| RE31,538 E | 3/1984 | Antonious |
| 4,524,464 A | 6/1985 | Primiano et al. |
| 4,561,122 A | 12/1985 | Stanley et al. |
| 4,565,195 A | 1/1986 | Eisenberg |
| 4,663,783 A | 5/1987 | Obayashi |
| 4,691,387 A | 9/1987 | Lopez |
| 4,698,851 A | 10/1987 | Dunford et al. |
| 4,738,447 A | 4/1988 | Brown |
| 4,742,579 A | 5/1988 | Dunford |

(Continued)

FOREIGN PATENT DOCUMENTS

CH       577 328       7/1976

(Continued)

OTHER PUBLICATIONS

Three photos of adidas, "Fingersave Glove", prior to Mar. 7, 2006.

(Continued)

*Primary Examiner*—Arti Singh-Pandey
(74) *Attorney, Agent, or Firm*—Goodwin Procter LLP

(57) ABSTRACT

The present invention relates a protective element for an athlete. The protective element can include a first flexible support layer, wherein a plurality of substantially hard projections is arranged on the first support layer, and a second flexible support layer, wherein a plurality of substantially hard receiving elements is arranged on the second support layer. The receiving elements and the projections are configured to provide flexible protection to various areas of a user's body.

24 Claims, 3 Drawing Sheets

U.S. PATENT DOCUMENTS

| | | | |
|---|---|---|---|
| 4,766,612 A | 8/1988 | Patton, Sr. |
| 4,776,111 A | 10/1988 | Crowley |
| 4,779,289 A | 10/1988 | Prouty |
| 4,787,376 A | 11/1988 | Eisenberg |
| 4,815,147 A | 3/1989 | Gazzano et al. |
| 4,864,659 A | 9/1989 | Morris |
| 4,865,023 A | 9/1989 | Craythorne et al. |
| 4,905,320 A | 3/1990 | Squyers, Jr. |
| 4,922,630 A | 5/1990 | Robinson |
| 4,930,162 A | 6/1990 | Côté |
| 4,958,384 A | 9/1990 | McCrane |
| 4,995,119 A | 2/1991 | Codkind |
| 5,018,221 A | 5/1991 | Romandetto |
| 5,033,119 A | 7/1991 | Wiggins |
| 5,050,319 A | 9/1991 | Perotto et al. |
| 5,056,509 A | 10/1991 | Swearington |
| 5,067,175 A | 11/1991 | Gold |
| 5,078,128 A | 1/1992 | Grim et al. |
| 5,083,314 A | 1/1992 | Andujar |
| D323,910 S | 2/1992 | Pierce, Jr. |
| 5,107,544 A | 4/1992 | Capatosto |
| 5,125,171 A | 6/1992 | Stewart |
| 5,136,725 A | 8/1992 | Montero |
| 5,140,995 A | 8/1992 | Uhl |
| 5,152,082 A | 10/1992 | Culpepper |
| 5,168,576 A | 12/1992 | Krent et al. |
| 5,175,947 A | 1/1993 | Parracho |
| 5,257,418 A | 11/1993 | Jaskiewicz |
| 5,267,677 A | 12/1993 | Nash |
| 5,295,269 A | 3/1994 | Ballard |
| 5,307,521 A | 5/1994 | Davis |
| 5,330,391 A | 7/1994 | Mitchell |
| 5,358,469 A | 10/1994 | Patchel et al. |
| 5,364,679 A | 11/1994 | Groves |
| 5,435,226 A | 7/1995 | McQuilkin |
| 5,456,650 A | 10/1995 | Williams, Jr. et al. |
| 5,486,157 A | 1/1996 | DiBenedetto |
| 5,511,242 A | 4/1996 | Bianchi |
| 5,511,243 A | 4/1996 | Hall et al. |
| 5,515,543 A | 5/1996 | Gioello |
| 5,518,802 A | 5/1996 | Colvin et al. |
| 5,551,083 A | 9/1996 | Goldsmith |
| 5,557,803 A | 9/1996 | Granich et al. |
| 5,628,069 A | 5/1997 | Ebert |
| 5,640,712 A | 6/1997 | Hansen et al. |
| 5,738,925 A | 4/1998 | Chaput |
| 5,741,222 A | 4/1998 | Fiore |
| 5,758,365 A | 6/1998 | Steeley |
| 5,768,717 A | 6/1998 | Le Sueur |
| 5,774,896 A | 7/1998 | Hochmuth |
| 5,774,897 A | 7/1998 | Hochmuth |
| 5,792,087 A | 8/1998 | Pringle |
| 5,799,659 A | 9/1998 | Stano |
| 5,802,614 A | 9/1998 | Melone, Jr. |
| 5,809,571 A | 9/1998 | Spitzer |
| 5,810,754 A | 9/1998 | Kenosh |
| 5,815,838 A | 10/1998 | Lord et al. |
| 5,848,440 A | 12/1998 | Pajorola |
| 5,881,385 A | 3/1999 | Hochmuth |
| 5,884,329 A | 3/1999 | Goldsmith et al. |
| 5,894,684 A | 4/1999 | Sand et al. |
| 5,896,683 A | 4/1999 | Foxen et al. |
| 5,933,868 A | 8/1999 | Bender |
| 5,937,444 A | 8/1999 | Hochmuth |
| 5,946,720 A | 9/1999 | Sauriol |
| 5,963,985 A | 10/1999 | Behr et al. |
| 5,974,588 A | 11/1999 | Furman |
| 5,983,396 A | 11/1999 | Morrow et al. |
| 6,012,170 A | 1/2000 | Kim |
| 6,024,712 A | 2/2000 | Iglesias et al. |
| 6,029,376 A | 2/2000 | Cass |
| 6,035,438 A | 3/2000 | Neal et al. |
| 6,055,676 A | 5/2000 | Bainbridge et al. |
| 6,083,184 A | 7/2000 | Kenosh |
| 6,112,434 A | 9/2000 | Seltzer et al. |
| 6,124,015 A | 9/2000 | Baker et al. |
| 6,223,350 B1 | 5/2001 | McFarlane |
| 6,301,722 B1 | 10/2001 | Nickerson et al. |
| 6,342,043 B1 | 1/2002 | Gottsmann et al. |
| RE37,705 E | 5/2002 | Donzis |
| 6,418,832 B1 | 7/2002 | Colvin |
| 6,427,695 B1 | 8/2002 | Zanetti et al. |
| 6,453,477 B1 | 9/2002 | Bainbridge et al. |
| 6,589,891 B1 | 7/2003 | Rast |
| 6,687,920 B2 | 2/2004 | Berns |
| 6,715,218 B2 | 4/2004 | Johnson |

FOREIGN PATENT DOCUMENTS

| | | |
|---|---|---|
| DE | 28 53 154 | 8/1980 |
| DE | 35 16 545 | 5/1985 |
| DE | 87 08 682.4 | 9/1987 |
| DE | 37 25 516 | 9/1988 |
| DE | 37 38 005 | 5/1989 |
| DE | 89 10 050.6 | 12/1989 |
| DE | 4128958 | 3/1993 |
| DE | 9312305 | 11/1993 |
| DE | 297 05 586 | 8/1998 |
| DE | 298 08 682 | 9/1999 |
| DE | 299 16 217 | 5/2000 |
| DE | 199 10 799 | 8/2000 |
| DE | 100 10 403 | 9/2001 |
| DE | 100 10 404 | 9/2001 |
| DE | 201 13 431 | 2/2002 |
| DE | 101 00 848 | 8/2002 |
| DE | 201 07 098 | 10/2002 |
| DE | 87 06 816.8 | 8/2007 |
| EP | 0 083 454 | 7/1983 |
| EP | 0765612 | 4/1997 |
| HU | 24401/99 | 6/1999 |
| JP | 09262332 | 10/1997 |
| WO | WO 99/23981 | 5/1999 |
| WO | WO 00/53275 | 9/2000 |
| WO | WO 01/00052 | 1/2001 |

OTHER PUBLICATIONS

Five photographs of a reinforcing element utilized in adidas "Fingersave Glove" (Ref. C1) (components partially separated), prior to Mar. 7, 2006.

PROTECTIVE ELEMENT

CROSS-REFERENCE TO RELATED APPLICATION

This application incorporates by reference, and claims priority to and the benefit of, German Patent Application Serial No. 102005010614.5, which was filed on Mar. 8, 2005, and European Patent Application No. 06001524.5, which was filed on Jan. 25, 2006, the entire disclosures of which are incorporated herein by reference.

TECHNICAL FIELD

The present invention relates to a protective element for use in, for example, sporting activities.

BACKGROUND

In many fields of sports, the body of an athlete has to be protected against injuries by suitable devices. For example, when playing ice hockey or football, the athletes wear helmets and thickly padded garments for protection against contact with other players or their sports equipment. Another example is shin guards for soccer players, which protect against injuries to the shin by the shoe and, in particular, the hard studs of an opposing player. Also, a shin guard prevents injuries to the shins by particularly fierce ball shots.

Shin guards of the prior art typically have one or more hard plastic plates and an attached cushioning material. Although such a construction generally provides sufficient protection, known shin guards have certain disadvantages. For example, the plates limit the freedom of movement of a player. Furthermore, complex mounting structures are necessary to assure that the shin guard does not change its position during use, which further hinders the player. As a result, many players play without the protection of a shin guard and prefer to take the risk of injuries. Similar problems arise with other protective elements for athletes, such as elbow and knee protectors for inline skaters or snowboarders, which are rejected by many athletes for reasons of comfort, since they also constrict the athlete's movement.

Compared to the design of protective sports devices, the construction of bulletproof vests is a completely different technical field. For example, U.S. Pat. No. 5,364,679, the entire disclosure of which is hereby incorporated herein by reference, discloses a body armor made from several layers of (hemi-) spheres, wherein the surfaces of opposing spheres contact each other at certain points. As a result, the impact force of a bullet hitting the vest is distributed onto a plurality of spheres and the bullet is effectively stopped. The adoption of this design for protective sports elements for athletes would lead to a device having a great thickness and a significant weight. It would, therefore, not improve the wearing comfort of the device.

There is, therefore, a need to provide a protective element, for example a shin guard, that overcomes the above mentioned disadvantages of the prior art, leads to a higher wearing comfort, and does not hinder the performance of the athlete. Additionally, there is a need to provide a protective element that can be used in a variety of sports equipment and to prevent injuries to various areas of the body, such as ankles, forearms, knees, the head, etc.

SUMMARY OF THE INVENTION

This problem is solved by a protective element for clothing, for example a shin guard, including a first flexible support layer onto which a plurality of substantially hard projections are arranged and extend therefrom and a second flexible support layer onto which a plurality of substantially hard receiving elements are arranged and extend therefrom. The combination of flexible first and second support layers on the one hand and hard projections and receiving elements, respectively, on the other hand provides, in accordance with the invention, a protecting surface that can, in contrast to the rigid plates of the prior art, flexibly adapt to the contour of the part of the body to be protected. This allows an individual fit of the protective element. The projections and receiving elements are not intended for attachment of one support layer to the other, but are intended to distribute and dampen (for example frictionally or by compression) impact loading and associated forces arising thereon. Furthermore, due to the flexibility of the support layers, the shape of the protective element can yield to movements of the body part to be protected, which increases the wearing comfort. This is particularly desirable if joints are to be protected, such as the elbow and the knee of an athlete.

Furthermore, the projections and the recesses provided by the complementary shaped sections of the receiving elements and/or their arrangement lead to a comparatively reduced thickness of the resulting hard protecting layer. This distinguishes the present protective element from the (hemi-) spheres that contact each other in a point-wise manner, as disclosed in U.S. Pat. No. 5,364,679.

In one aspect, the invention relates to a protective element including a first flexible support layer, a plurality of substantially hard projections arranged on the first support layer, a second flexible support layer adjacent the first flexible support layer, and a plurality of substantially hard receiving elements arranged on the second support layer. The receiving elements include either a substantially complementary shape to the projections or a defined spacing from one another to define recesses for receiving the projections, or both.

In various embodiments, a shape of the projections and/or the receiving elements is selected from the group consisting of polygonal, arcuate, and combinations thereof. In a particular embodiment, the projections have a rounded shape (i.e., convex) and the receiving elements include sections having a correspondingly rounded shape (also convex; however, a plurality of adjacent receiving elements may form a quasi concave receptacle for receiving a projection). In such an arrangement, the rounded projections can slide within the rounded sections without jamming when the flexible support layer is bent to adapt to the natural contour or to a movement of the body part. The protection provided by the hard layer made from the projections and the receiving elements of the protective element is not reduced in such a situation. In one embodiment, the receiving elements are arranged such that several, for example four, receiving elements define a recess for receiving a projection. A load applied to a certain area on the projection element, for example by a single stud, acting on the outside onto the protective element, is thereby distributed over a greater area and is thus dispersed. At least one of the projections and the receiving elements can be made of a substantially incompressible plastic material. The protective element can also include a coating disposed on an outer surface thereof.

In addition, the protective element can include an outer support layer including the first flexible support layer and the projections and an inner support layer including the second flexible support layer and the receiving elements. The first flexible support layer and the second flexible support layer can be arranged such that the plurality of projections is arranged substantially in a plurality of recesses formed by the plurality of receiving elements. The projections can be arranged separately from each other on the first flexible support layer, and the receiving elements can be arranged separately from each other on the second flexible support layer. Such an arrangement facilitates a change of the configuration of the two flexible support layers to adapt to the contour of the part of the body to be protected. The projections and/or receiving elements can be formed on a single substrate mounted on or acting as the respective flexible support layer or be individual pieces mounted on their respective flexible support layer. In the case of a common substrate mounting, the projections and/or receiving elements can be spaced apart to allow for a respective reorientation of the two flexible support layers.

In other embodiments, the protective element includes interconnecting ridges arranged between adjacent projections and/or adjacent receiving elements. At least one of the first flexible support layer and the second flexible support layer can include a cloth and/or a cushioning layer. A cloth support layer allows the easy integration of a protective element into a garment, such as the sock of a soccer player. In one embodiment, the cushioning layer can include a plurality of plastic fibers arranged between two fabrics, with the fibers extending substantially perpendicular to a surface of the two fabrics. Such a layer design, which is also designated as "3D-mesh," permanently provides good cushioning properties at a low weight and good ventilation properties. Contrary to common foamed materials, a 3D-mesh is permeable for air flow through and within the mesh. Alternatively, it is also conceivable to use a layer of foamed material or any other material that provides cushioning.

In various embodiments, the invention includes a shin guard or article of clothing including at least one protective element in accordance with the invention. The article of clothing can be selected from the group consisting of a forearm guard, pants, a vest, a jacket, a cap, a glove, an article of footwear, and a sock. In one embodiment, the article of clothing includes a pocket and at least one protective element arranged therein. At least one of the flexible support layers can be integral with a fabric layer of the article of clothing. Furthermore, the protective element can include a contoured shape.

These and other objects, along with advantages and features of the present invention herein disclosed, will become apparent through reference to the following description, the accompanying drawings, and the claims. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which.

DETAILED DESCRIPTION

In the following, embodiments of the invention are described with reference to a multi-layer protective element for a shin guard for a soccer player; however, it is to be understood that the present invention can also be used for a variety of other kinds of protection devices for athletes, such as protective elements for elbows, knees, and the head to be used by inline skaters, skateboarders, and snowboarders. Other applications include protective elements for hockey players, for example a goalkeeper, and also for motor-cyclists or downhill mountain bikers. Another application for the protective elements is as shoulder pads for use in rugby or football. The protective element can be integrated directly into an article of clothing or be arranged in a corresponding pocket. Also, mixed designs are possible where only parts, for example the support layer, are integrated into the fabric of the article of clothing and the other components are detachably secured thereto.

Figure 1A:
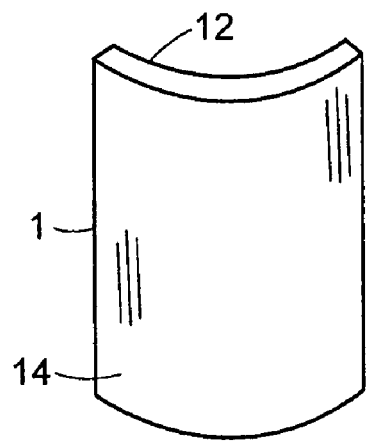
FIG. 1A is a schematic perspective view of one embodiment of a protective element in accordance with the invention.
Figure 1B:
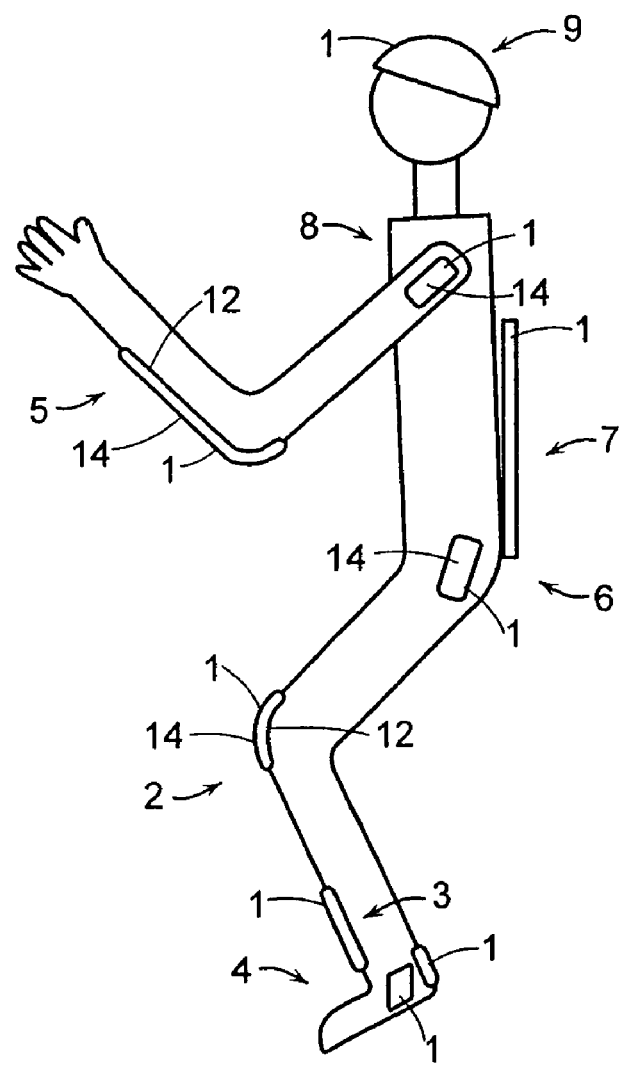
FIG. 1B is a schematic representation of a plurality of protective elements disposed proximate various areas of a human body.

FIG. 1A shows a schematic perspective view of one embodiment of a protective element 1. The protective element 1 may be applied to various areas of the body to protect those areas from injury due to impact. The protective element 1 has an interior side 12, or inner support layer, that is typically arranged towards the body, and an exterior side 14, or outer support layer, that is typically arranged away from the body. FIG. 1B depicts a plurality of protective elements 1 disposed at various areas of a human body. Some examples of where the elements 1 can be located include: the knee 2, the shin 3, the foot 4, the elbow and forearm 5, the hip 6, the back 7, the shoulder 8, and the head 9.

Figure 2A:
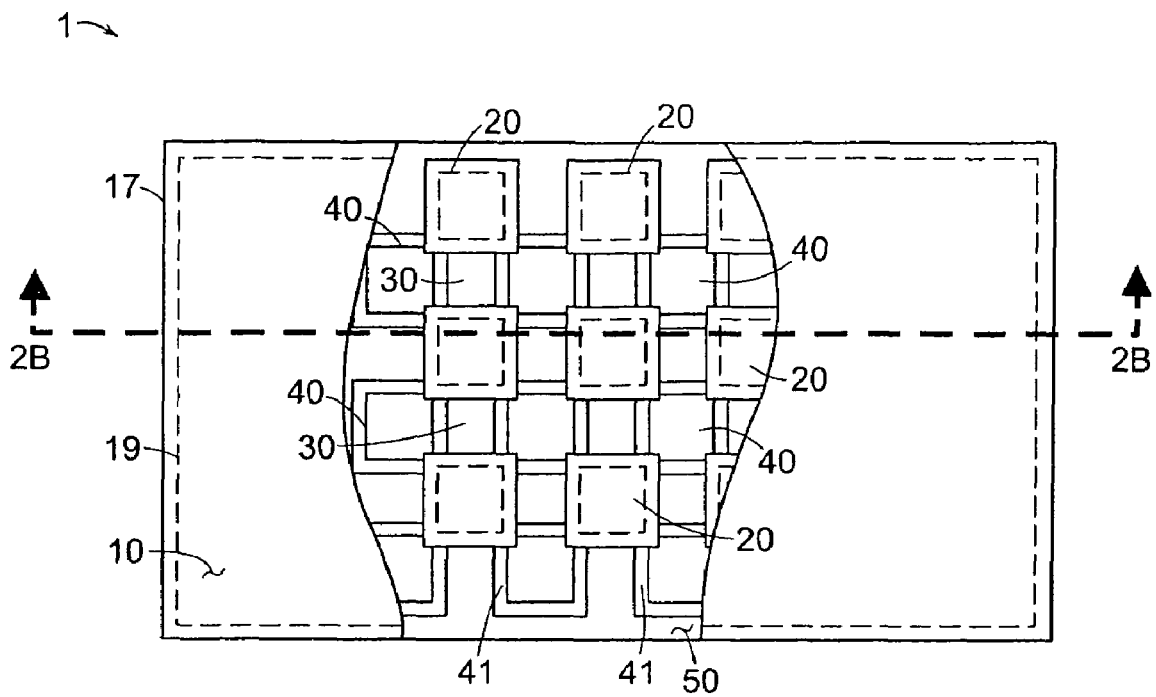
FIG. 2A is a schematic plan view of a protective element in accordance with one embodiment of the invention.
Figure 2B:
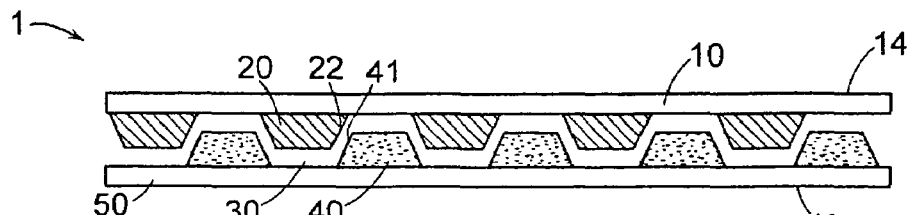
FIG. 2B is a schematic cross-section of the embodiment of FIG. 2A taken at line 2B-2B.

FIGS. 2A and 2B schematically illustrate a general design of one embodiment of a protective element 1 in accordance with the invention. A plurality of projections 20 are attached to a first support layer 10, for example a suitable fabric or a sufficiently stable foil. In one embodiment, the support layer 10 is directed to the exterior side 14, when the element 1 is in use, so that the projections 20 are inwardly oriented in the direction of the part of the body to be protected (see FIG. 1B). As shown in FIG. 2A, a portion of the support layer 10 is removed, thereby providing a clearer view of one possible arrangement of the projections 20 and receiving elements 40. The projections 20 extend into recesses 30 that can be formed by several receiving elements 40. In the embodiment shown, the projections 20 and receiving elements 40 have the shape of a frustum; however, as discussed hereinabove, the shape of the projections 20 and the receiving elements 40 can vary. The receiving elements 40 are in turn attached to a second support layer 50. The support layers 10, 50 can be relatively flexible to allow the protective element 1 to conform to the contours of the area to be protected. The flexibility of the support layers 10, 50 will vary based on, for example, the materials used, the material thickness, and the number of layers used. The overall flexibility of the protective element 1 can be varied to suit a particular application.

Figure 3A:
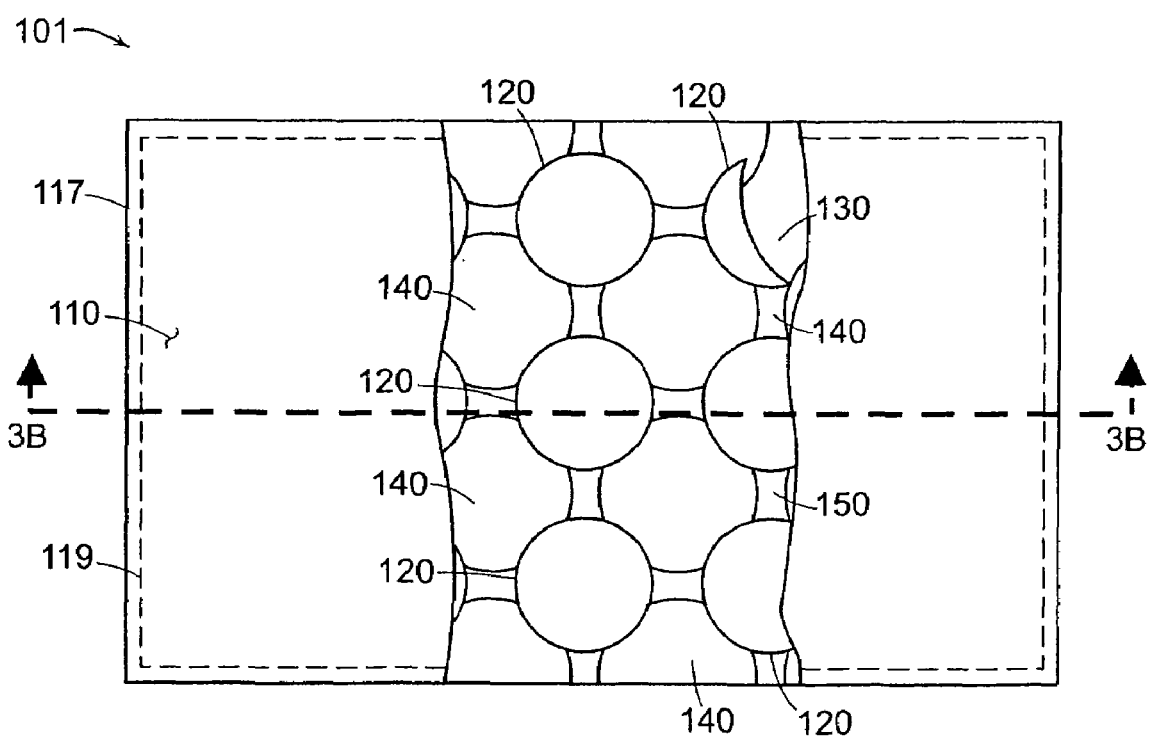
FIG. 3A is a schematic plan view of a protective element in accordance with an alternative embodiment of the invention.
Figure 3B:
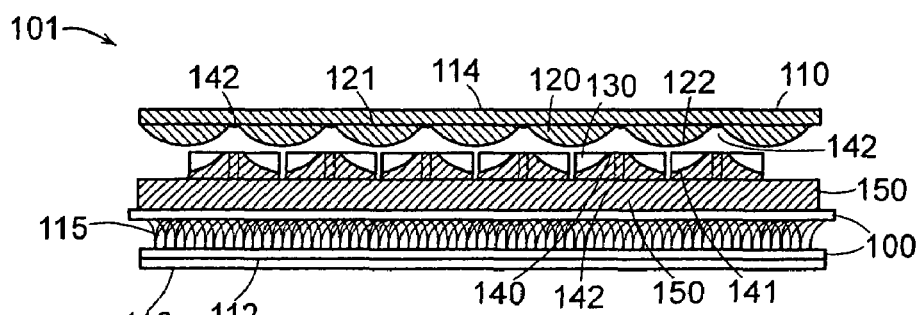
FIG. 3B is a schematic cross-section of the embodiment of FIG. 3A taken at line 3B-3B.

FIGS. 3A and 3B schematically illustrate an alternative embodiment of a protective element 101 in accordance with the invention, where the projections 120 and corresponding support layer 110 are provided as a single piece, for example an injection-molded piece. Similarly, the receiving elements 140 can be integrally manufactured together with the second support layer 150, again, for example, by injection molding. Manufacturing the projections 120 and the receiving elements 140 together with the respective support layers 110, 150, can significantly reduce manufacturing costs. In a particular embodiment, the integrally formed support layers 110 and 150 are sufficiently thin and/or made from a sufficiently flexible material, such that the shape of the overall protective element 101 can adapt to the outer contour of the area to be protected, for example the shin. As shown in FIG. 3A, a portion of the support layer 110 is removed, thereby providing a clearer view of another possible arrangement of the projections 120 and receiving elements 140.

The protective element 101 depicted in FIG. 3B also includes a 3D-mesh cushioning layer 100, 115 arranged under the lower support layer 150. The 3D-mesh cushioning layer 100, 115 will be described in greater detail with reference to FIG. 6. Furthermore, there may be one or more additional cushioning layer(s) 118 added below or above the support layers 110, 150 made from, for example, a comparatively soft foamed material, such as ethylene vinyl acetate (EVA).

To prevent the layer ensembles of FIGS. 2A, 2B, 3A, and 3B from disintegrating or otherwise separating, the various layers can be stitched together along the outer edges 17, 117 of the protective element 1, 101. The projections 20, 120 and the receiving elements 40, 140 essentially float with respect to one another in their proper orientation. Additional stitching 19, 119 or other attachment means can, however, be added at various locations of the protective element 1, 101 to further hold the layers together, since the projections 20, 120 and the receiving elements 40, 140 provide no mechanical retention between the layers. As mentioned before, such a protective layer ensemble can be integrated into the fabric of a garment or arranged in a suitable pocket of a garment. In one embodiment, the layers can be held together with hook and loop type fasteners, such as the Velcro® brand sold by Velcro Industries B.V. Such an arrangement can allow for interchangeability between support layers to, for example, suit different sports or wearers, or to replace a worn outer layer. Additionally, this releasable arrangement makes the layers repositionable with respect to one another.

In the embodiments of FIGS. 2A, 2B, 3A, and 3B, when the projections 20, 120 are positioned in the recesses 30, 130, they form, together with the receiving elements 40, 140, a substantially closed, hard layer that can not be penetrated by an impinging outer device, such as a pointed stud. As a result, the part of the body arranged below the layer is protected. In one embodiment, the projections 20, 120 and the receiving elements 40, 140 have sections with substantially complementary shapes, for example the essentially parallel side-surfaces 22 and 41 shown in FIG. 2B or the round projections 120 and the round recesses 130 in FIG. 3B, such that the projections 20, 120 and the receiving elements 40, 140 can engage each other. Alternatively or additionally, the receiving elements 40, 140 can be arranged at a sufficient distance from one another on the support layer, such that the relative positions of the receiving elements 40, 140 influence the engagement of the projections 20, 120 therewith.

In order to provide the desired protection, the projections 20, 120 and/or the receiving elements 40, 140 are made from a sufficiently hard material, although the exact degree of hardness of the material depends on the loads to be expected. It is also conceivable that the projections 20, 120 and/or the receiving elements 40, 140 can be deformable, so as to provide an additional cushioning effect to the protective element 1, 101. Since the projections 20, 120 only contact the receiving elements 40, 140 and are not permanently connected or otherwise secured thereto, the layer ensembles shown in FIGS. 2A, 2B, 3A, and 3B can also have a curved shape, if necessary, to match the contour or a movement of the part of the body to be protected.

The projections 20 and the receiving elements 40 of FIGS. 2A and 2B can be anchored to the support layers 10, 50, respectively, using any suitable method, for example stitching or gluing. In addition to stitching, gluing, or similar methods, it has been found to be particularly advantageous if the plastic material of the projections 20 and the receiving elements 40 is directly molded, injection molded, or flow molded on to a support layer, as this process can be easily automated. In one embodiment, the plastic material can be thermoplastic polyurethane (TPU) or a polyolefin, such as, for example, acryl butadiene styrole (ABS). The individual projections 20 and the receiving elements 40 are preferably separately arranged on their respective support layers; however, as shown in FIG. 3B, the individual projections 120 and the receiving elements 140 can be integrally manufactured together with their respective support layers 110, 150.

Furthermore, it is also possible to provide interconnecting ridges 142 between individual projections 120 or receiving elements 140, respectively. Use of the interconnecting ridges allows for selectively modifying the possible overall configurations of the protective element 101. For example, in the case of a protective element 101 embodied in a shin guard, it is possible to provide rows of projections 120 and/or rows of receiving elements 140 with interconnecting ridges 142 disposed between the individual projections 120 or receiving elements 140 in a row extending in a longitudinal direction of the shin guard. Such a shin guard can still be flexibly adapted to the individual curvature of the shin; however, in the longitudinal direction the shin guard is substantially rigid. The interconnecting ridges 142 modify the flexibility of the protective element 1, 101 and can be used in any of protective elements described herein.

Figure 4:
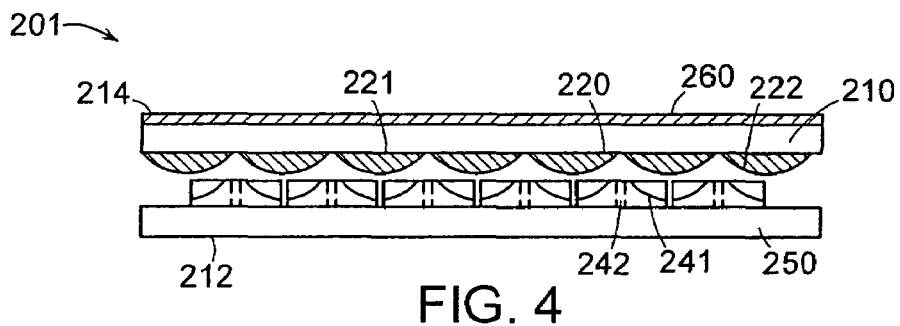
FIG. 4 is a schematic cross-section of a protective element in accordance with an alternative embodiment of the invention.
Figure 5:
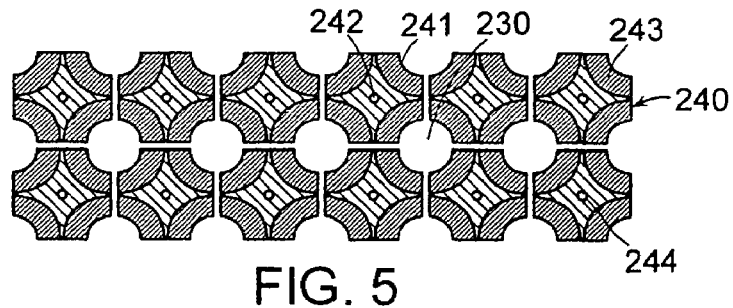
FIG. 5 is a schematic top view of the receiving elements in the embodiment of FIG. 4.

FIGS. 4 and 5 disclose another alternative embodiment of a protective element 201 in accordance with the invention. Similar to the embodiment of FIGS. 3A and 3B, the projections 220 have a rounded shape in this embodiment, in particular a dome shape. The recesses 230 are each formed by four receiving elements 240 having correspondingly rounded side surfaces 241, which can be engaged by the rounded projections 220. Due to the rounded shape of the projections 220 and recesses 230 formed by the receiving elements 240, the protective elements 201 shown in FIGS. 4 and 5 can be bent more easily than the protective element 1 of FIGS. 2A and 2B. A jamming of some projections and receiving elements is excluded.

The projections 20, 120, 220 and receiving elements 40, 140, 240 can, however, be essentially any size and shape, for example, polygonal, arcuate, and combinations thereof. In the present application, the term polygonal is used to denote any shape including at least two line segments, such as rectangles, trapezoids, triangles, hexagonal, pyramidal, frusto-conical, quadrangles, etc. Arcuate shapes include circles, domes, ellipses, etc. Asymmetrical shapes are also possible. Generally, the receiving elements 40, 140, 240 have a corresponding shape to the projections 20, 120, 220 so as to achieve the described protective effect. The receiving elements 40, 140, 240 can additionally or alternatively have corresponding distances therebetween to also provide an area of contact for the projections 20, 120, 220 also so as to achieve the described protective effect. In addition, the size and shape of the protective elements 1, 101, 201 may vary to suit a particular application. The protective element 1, 101, 201 can have essentially any shape, such as polygonal, arcuate, or combinations thereof, and will be sized based, at least in part, on the area of the body to be protected and the relative size of the wearer.

FIG. 4 shows a section through the layer ensemble, where the first support layer 210 and the second support layer 250 are arranged with a distance therebetween, so that the individual projections 220 and the receiving elements 240 can be recognized separately from each other. As previously described, the two support layers 210, 250 in the protective element 201 can be interconnected at their side edges, for example by stitching, gluing, or welding; however, such a connection is not necessary, for example, if the protective element 201 is arranged within a pocket.

The top view of FIG. 5 illustrates that the recesses 230 that receive the dome-shaped projections 220 are provided by four adjacent receiving elements 240. As a result, an impact force exerted onto a certain point of the flat outer surface (221 in FIG. 4) of the projection 220, for example by a pointed stud, is distributed over the overall surface of the four receiving elements 240 and, therefore, has a lesser impact on the part of the body that is arranged below the protective element 201.

Apart from the rounded side surfaces 241, each receiving element 240 includes in the embodiment shown in FIG. 5 a star-like central area 243. For reducing the weight, a hole 244 may be arranged in the center of this area 243. In a similar manner, the central region of the recess 236 could be free from material, since it is sufficient for the round projection 220 to be maintained in a central position between the four receiving elements 240 by the rounded side surfaces 241. This leads to a reduced thickness of the overall layer ensemble and to a lower weight. In other embodiments, the recess 230 is not free from material.

The overall layer ensemble according to any of the embodiments described herein can be directly integrated into a suitable garment. To this end, the first support layer 10 and/or the second support layer 50 may be part of the cloth used for producing, for example, a sock, trousers and/or a jacket. The cloth can be a textile having natural or artificial fibers and either woven or non-woven. Since the projections 20 engage the recesses 30, a comparatively thin hard layer is achieved, which is less bulky than protective elements according to the prior art. Alternatively, an insert with the layer ensemble shown in FIGS. 2 to 5 could be inserted into a pocket or the like of a garment, such as a sock. An example of a support device disposed in a pocket on a garment is described in U.S. Pat. No. 6,715,218, the entire disclosure of which is hereby incorporated herein by reference in its entirety. In addition, it is also possible to form a protective element in a bandage-like configuration that can be wound, like a bandage, around the part of the body to be protected.

To avoid a premature wear of the outer support layer 210, an additional coating 260 may be arranged on its exterior side 214, which may, for example, include suitable rubber ribs. In the case of a shin guard, the rubber coating 260 provides a better control of the ball in addition to protection against wear and tear in a situation where it is necessary to contact the ball with the shin. Also in the case of other protective elements, as they are in an exemplary manner mentioned above, the additional coating 260 may have other advantages. The coating 260 can, similar to the projections 220 and the receiving elements 240, be directly molded onto the support layer 210. Alternatively, it is also possible to directly interconnect the coating 260 and the outside 221 of a projection 220 by, for example, gluing and/or welding through the support layer 210. It is also conceivable to injection mold the additional coating 260 together with the injection molding of the projections 220 and/or the support layer 210, to further facilitate production. Alternatively or additionally, the coating 260 can be added for aesthetic purposes, for example, the addition of a team logo or other indicia. Also, the coating 260 can be sprayed on to the exterior side 214 of the protective element 201 to influence other performance characteristics of the protective element 260, for example, a coating to increase or reduce the frictional properties of the exterior side 214 of the protective element 201.

The arrangements shown in FIGS. 2 to 5 serve to avoid the penetration of a pointed device into the part of the body to be protected; however, these same arrangements also effectively disperse the hitting shock over a broader surface. For a shin guard, but also for other protective elements, it is additionally desirable to provide a cushioning layer for cushioning the arising impact by a suitable deformation. To this end, an appropriate cushioning material can be arranged in the region of the first support layer 10 and/or the second support layer 50 made, for example, from a foamed material, such as an EVA foam.

Figure 6:
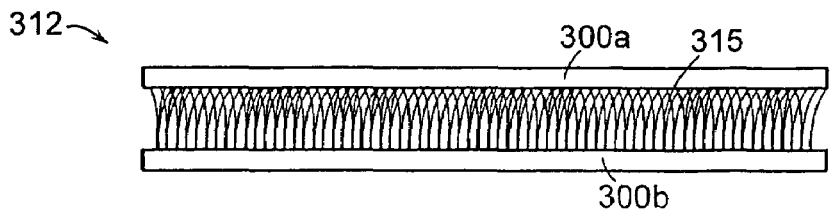
FIG. 6 is a schematic cross-section of a 3D-mesh as it may be used in a protective element in accordance with one embodiment of the invention.

FIG. 6 depicts one embodiment of a cushioning material 312 for use in a protective element in accordance with the invention. A plurality of plastic fibers 315 is arranged between two fabric layers 300 and extends substantially perpendicularly to the surface of the two fabric layers 300. When such a 3D mesh type cushioning material is compressed, i.e. when the two fabric layers 300 are moved in the direction of each other, the plurality of plastic fibers 315 must be bent and frictionally pass each other. As a result, the compression movement is effectively cushioned, since the fibers 315 are elastic and try to return to their original configuration.

Such a cushioning material is very long-lasting and, therefore, particularly suitable to be used in conjunction with the layer ensemble of FIGS. 2 to 5. One of the two fabrics 300 may simultaneously provide the function of one of the two support layers 10, 50 so that the resulting layer ensemble provides a protecting function as well as a cushioning function. As already explained, a further advantage of the use of a 3D-mesh are the good ventilation properties provided by this material. Contrary to common cushioning materials, such as, for example, rubber foams, a flow of air can easily pass through a 3D-mesh in all directions. This advantage is desirable, in particular for protective elements integrated into articles of clothing for athletes.

Protective elements that are subjected to particularly high loads may include a combination of several protection layers including outer projections 20 and correspondingly shaped receiving elements 40 with the discussed cushioning material. The explained cushioning material can, for example, be arranged between two hard protection layers, where the upper fabric layer 300a is the lower support layer of the upper protection layer and the lower fabric layer 300b is the upper support layer of the lower protection layer. If used in a shin guard, such a design leads to particularly effective protection against penetration of the pointed studs of an opposing player.

Generally, the various components can be manufactured by, for example, molding or extrusion. Extrusion processes may be used to provide a uniform shape. Insert molding can then be used to provide the desired geometry of open spaces, or the open spaces could be created in the desired locations by a subsequent machining operation. Other manufacturing techniques include melting or bonding. For example, the various elements may be bonded to the various layers with a liquid epoxy or a hot melt adhesive, such as EVA. In addition to adhesive bonding, portions can be solvent bonded, which entails using a solvent to facilitate fusing of the portions to be added. The various components can be separately formed and subsequently attached or the components can be integrally formed by a single step called dual injection, where two or more materials of differing densities are injected simultaneously.

In addition to the materials described hereinabove, the various components can be manufactured from other suitable polymeric material or combination of polymeric materials, either with or without reinforcement. Suitable materials include: polyurethanes; EVA; thermoplastic polyether block amides, such as the Pebax® brand sold by Elf Atochem; thermoplastic polyester elastomers, such as the Hytrel® brand sold by DuPont; thermoplastic elastomers, such as the Santoprene® brand sold by Advanced Elastomer Systems, L.P.; thermoplastic olefin; nylons, such as nylon 12, which may include 10 to 30 percent or more glass fiber reinforcement; silicones; polyethylenes; acetal; and equivalent materials. Reinforcement, if used, may be by inclusion of glass or carbon graphite fibers or para-aramid fibers, such as the Kevlar® brand sold by DuPont, or other similar method. Also, the polymeric materials may be used in combination with other materials, for example natural or synthetic rubber. Other suitable materials will be apparent to those skilled in the art.

Having described certain embodiments of the invention, it will be apparent to those of ordinary skill in the art that other embodiments incorporating the concepts disclosed herein may be used without departing from the spirit and scope of the invention. The described embodiments are to be considered in all respects as only illustrative and not restrictive.

What is claimed is:

1. A protective element comprising:
   a first flexible support layer;
   a plurality of substantially hard projections arranged on the first support layer;
   a second flexible support layer adjacent the first flexible support layer; and
   a plurality of substantially hard receiving elements arranged on the second support layer, wherein the receiving elements comprise at least one of a substantially complementary shape to the projections and a defined spacing from one another to define recesses for receiving the projections.

2. The protective element of claim 1, wherein a shape of the projections is selected from the group consisting of polygonal, arcuate, and combinations thereof.

3. The protective element of claim 1, wherein a shape of the receiving elements is selected from the group consisting of polygonal, arcuate, and combinations thereof.

4. The protective element of claim 1, wherein the projections comprise a rounded shape and the receiving elements comprise sections having a correspondingly rounded shape.

5. The protective element of claim 1, wherein the receiving elements are arranged such that four receiving elements define a recess for receiving a projection.

6. The protective element of claim 1, wherein at least one of the projections and the receiving elements comprise a substantially incompressible plastic material.

7. The protective element of claim 1 further comprising:
   an outer support layer comprising the first flexible support layer and the projections; and
   an inner support layer comprising the second flexible support layer and the receiving elements.

8. The protective element of claim 1, wherein the first flexible support layer and the second flexible support layer are arranged such that the plurality of projections is arranged substantially in a plurality of recesses formed by the plurality of receiving elements.

9. The protective element of claim 1, wherein the projections are arranged separately from each other on the first flexible support layer.

10. The protective element of claim 1, wherein the receiving elements are arranged separately from each other on the second flexible support layer.

11. The protective element of claim 1 further comprising interconnecting ridges arranged between at least one of adjacent projections and adjacent receiving elements.

12. The protective element of claim 1, wherein at least one of the first flexible support layer and the second flexible support layer comprises a cloth.

13. The protective element of claim 1, wherein at least one of the first flexible support layer and the second flexible support layer comprises a cushioning layer.

14. The protective element of claim 13, wherein the cushioning layer comprises a plurality of plastic fibers arranged between two fabrics, the fibers extending substantially perpendicular to a surface of the two fabrics.

15. The protective element of claim 1, further comprising a coating disposed on an outer surface of the protective element.

16. The protective element of claim 1, wherein the first flexible support layer and the plurality of projections are integrally formed.

17. The protective element of claim 1, wherein the second flexible support layer and the plurality of receiving elements are integrally formed.

18. A shin guard comprising at least one protective element according to claim 1.

19. An article of clothing comprising at least one protective element according to claim 1.

20. The article of clothing of claim 19, wherein the article is selected from the group consisting of a shin guard, a forearm guard, pants, a vest, a jacket, a cap, a glove, an article of footwear, and a sock.

21. An article of clothing comprising a pocket and at least one protective element according to claim 1 arranged therein.

22. The article of clothing of claim 19, wherein at least one of the flexible support layers is integral with a fabric layer of the article of clothing.

23. The article of clothing of claim 21, wherein at least one of the flexible support layers is integral with a fabric layer of the article of clothing.

24. The protective element of claim 1, wherein the protective element comprises a contoured shape.

* * * * *